United States Patent
Kamiya et al.

(10) Patent No.: US 7,431,407 B2
(45) Date of Patent: Oct. 7, 2008

(54) VEHICLE BRAKE DEVICE

(75) Inventors: Masahiko Kamiya, Kariya (JP); Taro Segawa, Kariya (JP); Takaaki Matsuhashi, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 129 days.

(21) Appl. No.: 11/017,686

(22) Filed: Dec. 22, 2004

(65) Prior Publication Data
US 2005/0162010 A1   Jul. 28, 2005

(30) Foreign Application Priority Data
Jan. 27, 2004  (JP) .............................. 2004-019082

(51) Int. Cl.
*B60T 8/44*  (2006.01)
*B60T 7/00*  (2006.01)

(52) U.S. Cl. ...................................... 303/114.3; 303/3
(58) Field of Classification Search .............. 303/114.3, 303/3, 15, DIG. 1, DIG. 2
See application file for complete search history.

(56) References Cited

U.S. PATENT DOCUMENTS

| | | | | |
|---|---|---|---|---|
| 5,326,158 | A * | 7/1994 | Ohori et al. ..................... | 303/3 |
| 5,941,608 | A * | 8/1999 | Campau et al. ........... | 303/113.4 |
| 6,135,575 | A * | 10/2000 | Feigel et al. .............. | 303/113.4 |
| 6,139,119 | A * | 10/2000 | Otomo ..................... | 303/113.1 |
| 6,142,586 | A * | 11/2000 | Sakai ......................... | 303/152 |
| 6,149,247 | A | 11/2000 | Hofmann et al. | |
| 6,217,127 | B1 * | 4/2001 | Kusano et al. ................. | 303/3 |
| 6,309,032 | B1 * | 10/2001 | Kusano et al. ............ | 303/116.1 |
| 6,585,332 | B2 * | 7/2003 | Kusano et al. ........... | 303/113.4 |
| 6,672,685 | B2 | 1/2004 | Ishimura et al. | |
| 6,685,278 | B2 * | 2/2004 | Kusano et al. ........... | 303/113.4 |
| 6,702,402 | B1 * | 3/2004 | Sawada et al. ........... | 303/113.1 |
| 6,938,965 | B2 * | 9/2005 | Pasquet et al. ........... | 303/115.4 |
| 6,957,870 | B2 * | 10/2005 | Kagawa et al. ........... | 303/113.4 |
| 2002/0067071 | A1 * | 6/2002 | Kusano et al. ........... | 303/113.4 |
| 2004/0124698 | A1 * | 7/2004 | Nakashima et al. ...... | 303/113.4 |

(Continued)

FOREIGN PATENT DOCUMENTS

JP        11-341604 A       12/1999

(Continued)

*Primary Examiner*—Melody M Burch
(74) *Attorney, Agent, or Firm*—Buchanan Ingersoll & Rooney PC (57) ABSTRACT

A vehicle brake device A is provided with a master cylinder 10 for generating a fluid pressure depending on the stepping state of a brake pedal 11 and a differential pressure control valve 43 constituted by a solenoid valve of the type that has two ports 43a, 43b and is capable of controlling the differential pressure between the both ports 43a and 43b. The differential pressure control valve 43 is connected at its port 43a to an outlet port 10a of the master cylinder 10. An ECU 70 controls the differential pressure control valve 43 to generate a controlled differential pressure corresponding to the pedal operation state of the brake pedal 11 between the both ports 43a and 43b. Thus, according to the vehicle brake device A, it can be realized to obtain a pedal feeling which is smooth without suffering any delay in response, to easily alter a reaction force property of the brake pedal for any of various vehicle models, and to decrease in cost as well as dimension.

10 Claims, 7 Drawing Sheets

U.S. PATENT DOCUMENTS

2004/0245850 A1* 12/2004 Sakai .................... 303/113.4
2005/0162008 A1* 7/2005 Bickel et al. ............ 303/113.4

FOREIGN PATENT DOCUMENTS

| | | | |
|---|---|---|---|
| JP | 2000-507188 A | 6/2000 | |
| JP | 2002-293229 A | 10/2002 | |
| WO | WO 0253436 A1 * | 7/2002 | |

* cited by examiner

VEHICLE BRAKE DEVICE

This application claims priority under 35 U.S.C. 119 with respect to Japanese Application No. 2004-019082 filed on Jan. 27, 2004.

BACKGROUND OF THE INVENTION

1. Field of the Invention

The present invention relates to a vehicle brake device.

2. Discussion of the Related Art

Heretofore, brake devices for vehicles of this kind, there has been known one which is provided with a master cylinder for generating a fluid pressure depending on the stepping state of a brake pedal and a pressurized fluid supply source which is provided separately from the master cylinder for supplying pressurized fluid to brake cylinders of wheels. In the brake device, the pressurized fluid supply source supplies the brake cylinders with pressurized fluid depending on the stepping state of the brake pedal in the normal state thereof, while the master cylinder which is operatively connected to the brake pedal supplies pressurized fluid required for the brake cylinders in the abnormal state of the pressurized fluid supply source. The vehicle brake device is provided with a stroke simulator for enabling the brake pedal to move through a stroke corresponding to the stepping state of the brake pedal in the normal state of the pressurized fluid supply source.

As the stroke simulator, as described in Japanese unexamined, published patent application No. 2002-293229 (patent document 1), there have been known one which is composed of mechanical components such as a piston 14, a retainer member 17, multiple springs 19, 20, a rubber cushion 21 and the like and which is capable of setting a reaction force property of the pedal in dependence on stroke amounts of the piston 14 and the retainer member 17 which work as movable parts and also in dependence on the resilient forces of the multiple springs 19, 20 and the rubber cushion 21. In this case, there can be attained different pedal feelings required for various vehicle models. However, the mechanical components constituting the stroke simulator have to be changed for alteration of the reaction force property, so that once set, the reaction force property cannot be altered easily. Further, since the stroke simulator is of the type which is composed of mechanical components, the non-uniformity in the reaction force property may be given among stroke simulators by the causes of the errors in assembling the components and other errors. This gives rise to another problem that the reaction force property cannot be adjusted easily.

As described in Japanese unexamined, published patent application No. 11-341604 (patent document 2), there has been proposed another brake device which is provided with an solenoid open/close valve (changeover valve) between a master cylinder and a stroke simulator and which is capable of adjusting the reaction force property of a brake pedal by controlling the open/close operation of the solenoid open/close valve. In addition, as described in Japanese translation 2000-507188 of PCT international application (patent document 3), there has been proposed still another brake device which is provided with a proportionally controlled solenoid valve and a low-pressure fluid accumulator in substitution for a stroke simulator not provided therein and which is capable of adjusting the reaction force property of a brake pedal by controlling the open/close operation of the proportionally controlled solenoid valve.

In the invention described in the patent document 2, the solenoid open/close valve (changeover valve) 14 of the normally closed type is provided between the master cylinder 1 and the stroke simulator 15, and the duty control of the solenoid open/close valve 14 is performed in dependence on the stepping amount of the brake pedal 2. More specifically, the duty control is performed in such a way that when the stepping amount of the brake pedal 2 is less than a predetermined value, the solenoid open/close valve 14 is kept around in a full-open state to make the variation amount in the brake pedal stroke larger relative to an increase in the brake pedal stepping force and that when the stepping amount of the brake pedal 2 increases to the predetermined value or larger, the solenoid open/close valve 14 is kept around in the closed state to make the variation amount in the brake pedal stroke smaller relative to an increase in the brake pedal stepping force. In this way, the flow volume flowing toward and away from the stroke simulator 15 is suppressed to change the reaction force of the brake pedal 2 dynamically.

Further, in the invention described in the patent document 3, two pedal path valves 32, 34 (constituted by proportional direction control valves or proportional pressured regulating valves) are provided together with low-pressure and high-pressure accumulators 20, 24 and a fluid pump 18 to constitute an active pedal-path simulator for power braking. During the power braking, a shut-off valve 14 is closed, whereby the brake fluid cannot be exhausted from a master brake cylinder 10 toward wheel brake cylinders 16. To obtain the pedal path nevertheless, the pedal path valve 34 arranged on a suction side of the fluid pump 18 is opened until a desired pedal path is attained. To return the brake pedal 46, the pedal path valve 32 arranged on an ejection side of the fluid pump 18 is opened, whereby the brake fluid is flowed from the high-pressure accumulator 24 into the master brake cylinder 10 to return the same together with the brake pedal 46 to their home positions.

The pedal path measured by a pedal path sensor 44 is adjusted in dependence on the pressure which is generated in the master brake cylinder 10 in dependence on the stepping force of the brake pedal 46 and which is measured by a stepping force sensor 42. A desired stepping force to path property curve can be adjusted in this manner. Further, the stepping force to path property curve can be easily varied by changing an adjusting algorithm which enables an electronic control device 54 to control the pedal path valves 32, 34. In this case, any change is not required regarding the mechanical components for fluid control in the vehicle brake device. Therefore, it becomes possible easily to adapt the vehicle brake device to various vehicle models.

In the aforementioned vehicle brake device described in the patent document 2, by performing the duty control of the solenoid 14 in dependence on the pedal stepping amount, the flow volume which is flown toward and away from the stroke simulator 15 is suppressed, so that the reaction force given to the brake pedal 2 is changed dynamically. However, when the solenoid open/close valve 14 is switched from a holding state (closed state) that is the state of the duty ratio being 0 (zero) percent, again to an open state, the delay in operation of the solenoid open/close valve 14 occurs by the cause of the duty control. This may result in bringing about an inoperative braking state in which the brake pedal 2 is tried to be stepped on, but does not move at that moment.

Also, in the aforementioned vehicle brake device described in the patent document 3, it can be realized to remove any mechanical type simulator as described in the patent document 1. However, instead, it is required to provide the two pedal path valves 32, 34 and the low-pressure accumulator 20. This causes the brake device to be increased in the number of the components and therefore, makes the brake device raised in cost and enlarged in dimensions.

SUMMARY OF THE INVENTION

Accordingly, it is a primary object of the present invention to provide an improved vehicle brake device which is capable of providing a smooth pedal feeling without suffering any delay in response, of being easily altered in the reaction force property of the brake pedal for adaptation to various vehicle modes and of being reduced in cost and downsized.

Briefly, according to the present invention, there is provided a vehicle brake device, which comprises a master cylinder for generating a fluid pressure depending on the stepping state of a brake pedal; at least one differential pressure control valve constituted by a solenoid valve of the type that has two ports and is capable of controlling the differential pressure between the both ports, and connected at one of the two ports thereof to an outlet port of the master cylinder; and control means for controlling the energization of the differential pressure control valve to generate a controlled differential pressure corresponding to the pedal operation state of the brake pedal between the both ports of the differential pressure control valve.

With this construction, since the control means energizes the differential pressure control valve to generate a controlled differential pressure corresponding to the pedal operation state of the brake pedal between the both ports thereof, it results that a pressure depending on the controlled differential pressure which corresponds at least to the pedal operation state is generated at the outlet port of the master cylinder. Thus, since the controlled differential pressure can be generated accurately and reliably even in any state of the pedal operation, any delay in operation can be prevented even when the differential pressure control valve is switched from the close stated again to the open state. Therefore, there can be obtained a pedal feeling which is smooth and does not suffer any delay in response. Further, since the controlled differential pressure can be easily altered only by varying the energization of the differential pressure control valve, it can be realized to alter the reaction force property of the brake pedal easily for each of the vehicle models.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
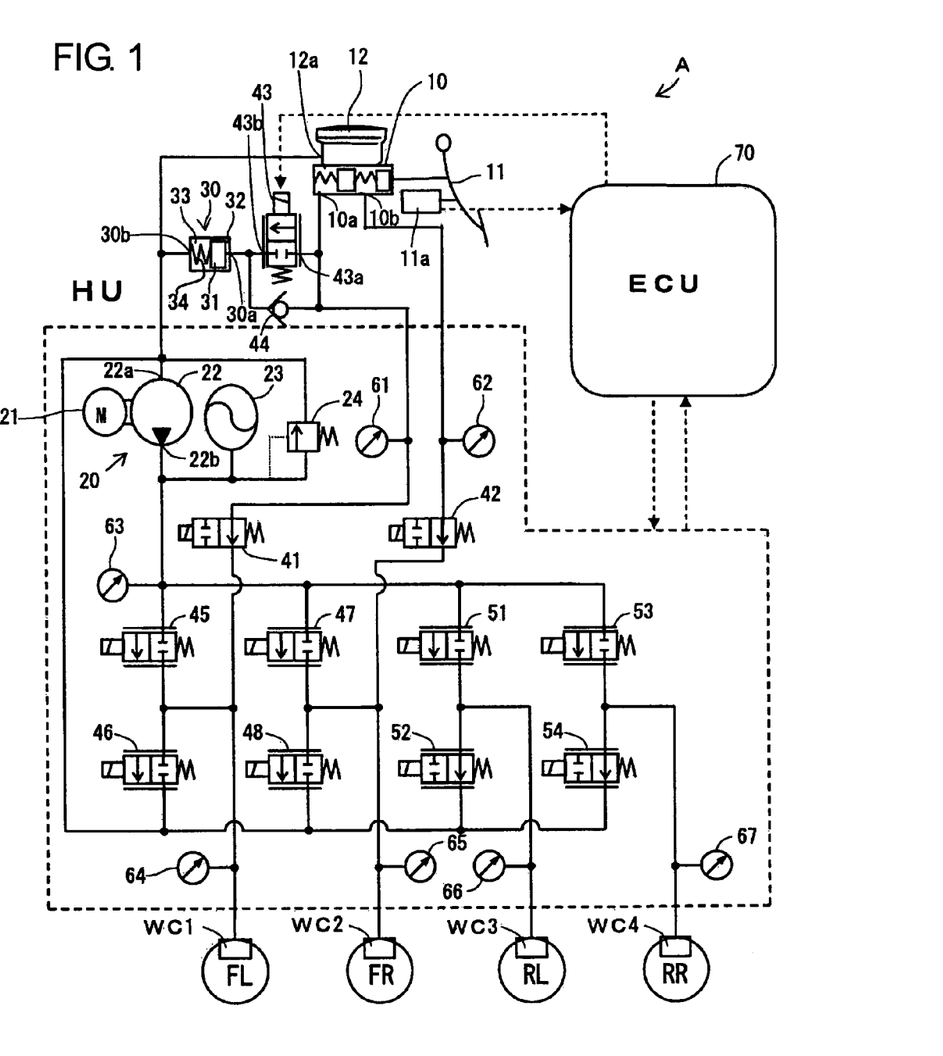
FIG. 1 is a fluid circuit diagram showing the schematic construction of a vehicle brake device in a first embodiment according to the present invention.

A vehicle brake device in a first embodiment according to the present invention will be described hereinafter with reference to the accompanying drawings. As shown in FIG. 1, a vehicle brake device A in this embodiment is of a so-called "brake-by-wire type" and is provided with a master cylinder 10 for generating the fluid pressure which depends on the stepping state of a brake pedal 11, and a pressurized fluid supply source 20 which is provided independently of the master cylinder 10 for supplying pressurized fluid to wheel cylinders (i.e., brake cylinders) WC1, WC2, WC3 and WC4 which respectively restrict rotations of left and right front wheels FL, FR and left and right rear wheels RL, RR of a vehicle (not shown). The brake device A is constructed so that in the normal (i.e., properly operating) state of the pressurized fluid supply source 20, the pressurized fluid whose pressure depends upon the brake pedal stepping force is supplied from the pressurized fluid supply source 20 to the wheel cylinders WC1-WC4 for the left and right front wheels FL, FR and the left and right rear wheels RL, RR and that in the abnormal (i.e., not properly operating) state of the pressurized fluid supply source 20, required pressurized fluid is supplied to the wheel cylinders WC1, WC2 of the left and right front wheels FL, FR of the vehicle from the master cylinder 10 which is operatively connected to the brake pedal 11. And, in the vehicle brake device A constructed as described above, there is provided a stroke simulator 30 for enabling the brake pedal 11 to move through a stroke of the length corresponding to the stepping state of the brake pedal 11 in the normal state of the pressurized fluid supply source 20.

The vehicle brake device A is provided with the master cylinder 10 capable of feeding two steams of brake oil (liquid) of substantially the same pressure from first and second outlet ports 10a, 10b in dependence on the stepping amount of the brake pedal 11. The first outlet port 10a of the master cylinder 10 communicates with the wheel cylinder WC1 for the front left wheel FL through a solenoid valve 41 when the same is not in the energized state as shown in FIG. 1. The second outlet port 10b of the master cylinder 10 communicates with the wheel cylinder WC2 for the front right wheel FR through a solenoid valve 42 when the same is not in the energized state as shown in FIG. 1. When selectively de-energized or energized, the solenoid valves 41, 42 are controllably changed over to make the master cylinder 10 communicate with or blocked from the wheel cylinders WC1, WC2. That is, these solenoid valves 41, 42 serve as master cylinder cutting valves which are closed to block the communication of the master cylinder 10 with the wheel cylinders WC1, WC2 when energized in the normal state of the pressurized fluid supply source 20 and which are opened to make the master cylinder 10 communicate with the wheel cylinders WC2, WC2 when de-energized in the abnormal state of the pressurized fluid supply source 20. The vehicle brake device A is further provided with a pedal stroke sensor 11a which is connected to the brake pedal 11 for detecting the moving amount (stroke amount or pedal stroke) of the brake pedal 11.

The stroke simulator 30 is connectable to the first outlet port 10a of the master cylinder 10 for communication therewith, and a differential pressure control valve 43 and a one-way valve 44 are provided in parallel relation between the master cylinder 10 and the stroke simulator 30. The stroke simulator 30 is of the mechanical type which is known as described in Japanese unexamined, published patent application No. 2002-293229 and operates to absorb the pressurized fluid supplied from the first outlet port 10a of the master cylinder 10. A piston 31 is fluid-tightly and slidably arranged in the stroke simulator 30, and first and second oil pressure chambers 32, 33 are defined by being partitioned by the piston 31. The first oil pressure chamber 32 is provided with an inlet port 30a communicating with the first outlet port 10a of the master cylinder 10 through the differential pressure control valve 43 and is supplied with the brake oil from the master cylinder 10 through the inlet port 30a. The second oil pressure chamber 33 is provided with an outlet port 30b communicating with an inlet port 12a of a reservoir tank 12 and permits the brake oil overflowed therefrom to be returned to the reservoir tank 12 through outlet port 30b. Further, the second oil pressure chamber 33 contains therein a spring 34, which urges the piston 31 against the oil pressure supplied from the master cylinder 10 in the communication state with the master cylinder 10. Instead, the present embodiment may be modified to lead the atmospheric pressure to the second oil pressure chamber 33.

The differential pressure control valve 43 is of the type that has two ports 43a and 43b which are connected respectively to the first outlet port 10a of the master cylinder 10 and the inlet port 30a of the stroke simulator 30 and that is capable of controlling the differential pressure between the both ports 43a and 43b. The differential pressure control valve 43 blocks the communication between the first outlet port 10a of the master cylinder 10 and the inlet port 30a of the stroke simulator 30 when in the de-energized state and makes the both ports 10a, 30a communicate to generate therebetween a differential pressure corresponding to the magnitude of energization when in the energized state. Further, The differential pressure control valve 43 operates as a stroke simulator cutting valve which is energized and opened in the normal state of the pressurized fluid supply source 20, thereby to bring the master cylinder 10 and the stroke simulator 30 into communication and which is de-energized and closed in the abnormal state of the pressurized fluid supply source 20, thereby to block the communication between the master cylinder 10 and the stroke simulator 30. The one-way valve 44 is provided between the first outlet port 10a of the master cylinder 10 and the inlet port 30a of the stroke simulator 30 in parallel relation with the differential pressure control valve 43 and permits the oil flow only from the stroke simulator 30 to the master cylinder 10. Since the differential pressure control valve 43 is a solenoid valve for generating the differential pressure proportional to the energization force, it can be done easily to generate such differential pressure by the use of a known solenoid valve.

The pressurized fluid supply source 20 is composed of an electric motor 21, a pump 22 and an accumulator 23. The pump 22 is driven by the electric motor 21 and ejects from an ejection port 22b the brake oil of the reservoir tank 12 which it draws from a suction port 22a communicating with the inlet port 12a of the reservoir tank 12. The accumulator 23 is in communication with the ejection port 22b of the pump 22 so that it stores the high pressure brake oil supplied from the pump 22 always at a predetermined oil pressure and supplies the brake oil to the wheel cylinders WC1-WC4 whenever required. Between the suction and ejection ports 22a, 22b of the pump 22, there is interposed a relief valve 24, which is operable to be closed when the pressure of the brake oil ejected from the pump 22 is less than a predetermined value and to be opened when it becomes the predetermined value or higher. Thus, the pressurized fluid supply source 20 supplies the wheel cylinders WC1-WC4 with the brake fluid of the predetermined high pressure.

The pressurized fluid supply source 20 communicates with the wheel cylinder WC1 for the front left wheel FL through a solenoid valve 45 when the same is in the energized state. The solenoid valve 45 is controllable by being energized to change over the open/close operation and when in the de-energized state shown in FIG. 1, blocks the pressurized fluid supply source 20 from the communication with the wheel cylinder WC1. The wheel cylinder WC1 communicates with the reservoir tank 12 through a solenoid valve 46 when the same is in the energized state. The solenoid valve 46 is controllable by being energized to change over the open/close operation and when in the de-energized state shown in FIG. 1, blocks the wheel cylinder WC1 from the communication with the reservoir tank 12.

Further, the pressurized fluid supply source 20 communicates with the wheel cylinder WC2 for the front right wheel FR through a solenoid valve 47 when the same is in the energized state. The solenoid valve 47 is controllable by being energized to change over the open/close operation and when in the de-energized state shown in FIG. 1, blocks the pressurized fluid supply source 20 from the communication with the wheel cylinder WC2. The wheel cylinder WC2 communicates with the reservoir tank 12 through a solenoid valve 48 when the same is in the energized state. The solenoid valve 48 is controllable by being energized to change over the open/close operation and when in the de-energized state shown in FIG. 1, blocks the wheel cylinder WC2 from the communication with the reservoir tank 12.

Further, the pressurized fluid supply source 20 communicates with the wheel cylinder WC3 for the rear left wheel RL through a solenoid valve 51 when the same is in the energized state. The solenoid valve 51 is controllable by being energized to change over the open/close operation and when in the de-energized state shown in FIG. 1, blocks the pressurized fluid supply source 20 from the communication with the wheel cylinder WC3. The wheel cylinder WC3 communicates with the reservoir tank 12 through a solenoid valve 52 when the same is in the de-energized state shown in FIG. 1. The solenoid valve 52 is controllable by being energized to change over the open/close operation and when in the energized state, blocks the wheel cylinder WC3 from the communication with the reservoir tank 12.

Further, the pressurized fluid supply source 20 communicates with the wheel cylinder WC4 for the rear right wheel RL through a solenoid valve 53 when the same is in the energized state. The solenoid valve 53 is controllable by being energized to change over the open/close operation and when in the de-energized state shown in FIG. 1, blocks the pressurized fluid supply source 20 from the communication with the wheel cylinder WC4. The wheel cylinder WC4 communicates with the reservoir tank 12 through a solenoid valve 54 when the same is in the de-energized state shown in FIG. 1. The solenoid valve 54 is controllable by being energized to change over the open/close operation and when in the energized state, blocks the wheel cylinder WC4 from the communication with the reservoir tank 12. It is more convenient to use those solenoid valves each of which is capable of generating a differential pressure proportional to an electromagnetic or energizing force applied thereto as is the differential pressure control valve 43, in substitution for the foregoing solenoid valves 45-48, 51-54.

The vehicle brake device A is further provided with oil pressure meters 61-67. The oil pressure meters 61, 62 are provided for detecting the oil pressures of brake oils supplied from the first and second outlet ports 10a, 10b of the master cylinder 10, respectively. The oil pressure meter 63 is provided for detecting the oil pressure of the brake oil supplied from the pressurized fluid supply source 20. And, the oil pressure meters 64-67 are provided for detecting the oil pressures of the brake oils supplied to and drained from the wheel cylinders WC1-WC4, respectively.

The vehicle brake device A is also provided with an ECU (Electronic Control Unit) 70, which is connected to the pedal stroke sensor 11a, the electric motor 21, the solenoid valves 41, 42, 45-48 and 51-54, the differential pressure control valve 43 and the oil pressure meters 61-67 which have been mentioned above. The ECU 70 is also connected to a speed sensor for detecting the body speed of the vehicle, a steering sensor for detecting the steering angle of the vehicle, a shift switch incorporated in a shift lever for detecting the shift position of the vehicle, an accelerator sensor assembled with a gas pedal for detecting the opening degree of the vehicle accelerator, and a yaw rate sensor for detecting a yaw rate acting on the vehicle (all not shown). By controlling the open/close motions of the solenoid valves 41, 42, 45-48 and 51-54 of the vehicle brake device A based on the detection signals from these sensors and the state of the shift switch, the ECU 70 controls the oil pressures delivered to the wheel cylinders WC1-WC4, that is, the brake forces applied to the respective wheels FL, FR, RL and RR. Further, by executing a program corresponding to a flow chart shown in FIG. 2, the ECU 70 controls the differential pressure control valve 43 to generate a controlled differential pressure depending on the operation state of the brake pedal 11 between the both ports 43a and 43b of the differential pressure control valve 43.

Figure 3:
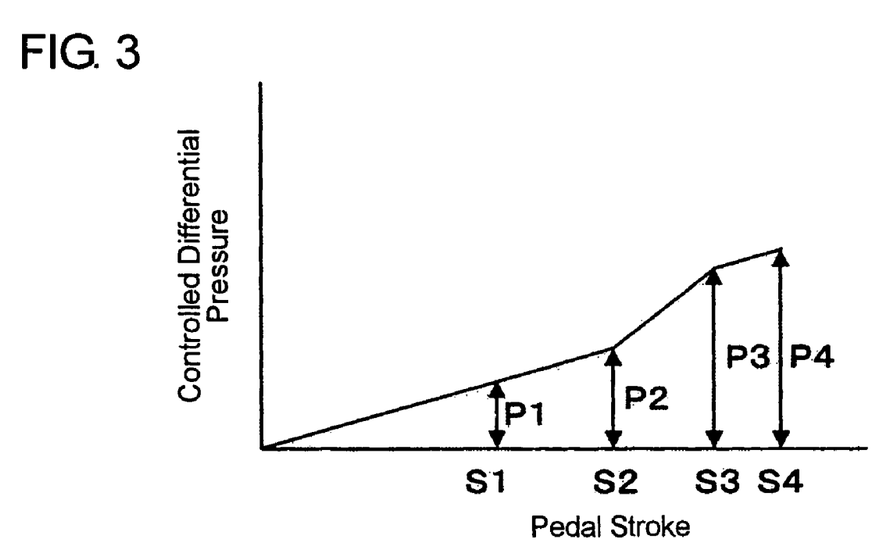
FIG. 3 is a graph showing the correlation between the controlled differential pressure generated by a differential pressure control valve of the normally closed type and the stroke of a brake pedal, the correlation being stored in the ECU shown in FIG. 1.

Further, a memory unit in the ECU 70 has beforehand stored a curve (operation expression) shown in FIG. 3. This curve represents the correlation between the pedal operation state (e.g., pedal stroke) and the controlled differential pressure. The controlled differential pressure represents the differences between a target property (f*) for each pedal stroke and a simulator property (fb) as a base property under a pedal stroke to pedal stepping force (master cylinder pressure) property shown in FIG. 6. That is, the controlled differential pressure represents the differential pressure which is to be generated so that it is added to the base property (fb) for the control to follow the target property (f*). More specifically, the differential pressures P1, P2, P3 and P4 for the pedal strokes S1, S2, S3 and S4 in FIG. 6 respectively represent the controlled differential pressures for the pedal strokes S1-S4. FIG. 3 represents the correlation therebetween. Herein, the "target property (f*)" means a pedal stroke to pedal stepping force property which the vehicle has been set up as a target. The "base property (fb)" means a pedal stroke to pedal stepping force property attributed to the mechanical construction which the vehicle actually has, and in this embodiment, means the pedal stroke to pedal stepping force property of the stroke simulator 30.

Figure 4:
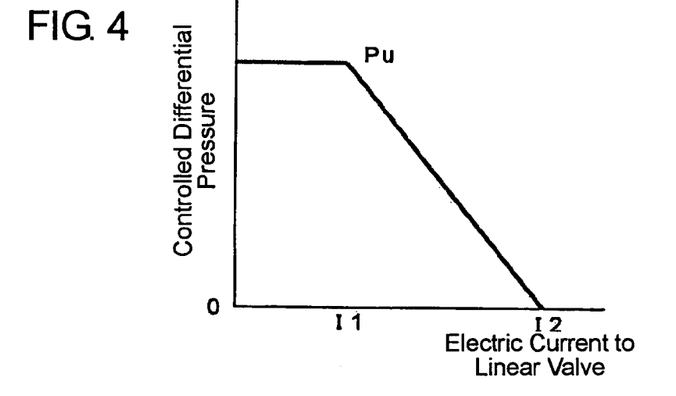
FIG. 4 is another graph showing the correlation between the controlled differential pressure generated by the differential pressure control valve of the normally closed type and the value of electric current applied thereto, the correlation being stored in the ECU shown in FIG. 1.

Further, the memory unit in the ECU 70 has beforehand stored another curve (operation expression) shown in FIG. 4. This curve represents the correlation between the controlled differential pressure across the differential pressure control valve 43 of the normally closed type and the electric current value applied to the differential pressure control valve 43. The differential pressure control valve 43 is of the type that is controlled as shown in FIG. 4, wherein it generates a predetermined differential pressure Pu within a predetermined current range up to a predetermined current value (I1) and also generates the controlled differential pressure which decreases inversely proportionally from the predetermined differential pressure (Pu) to 0 (zero) within another predetermined current range I1 to I2. The correlations shown in FIGS. 3 and 4 may be stored in the memory unit of the ECU 70 in the form of maps or tables.

Referring back to FIG. 1, those components encircled by a broken line are built up as a single assembly to constitute a hydraulic unit generally indicated at HU.

Next, brief description will be made regarding the general operation of the vehicle brake device A as constructed above. In the normal state or properly operating state of the pressurized fluid supply source 20, the stepping of the brake pedal 11 causes the solenoid valves 41, 42 which have been in open states, to be closed. This results in discontinuing the supply of the brake oil from the master cylinder 10 to the wheel cylinders WC1, WC2. At this time, the differential pressure control valve 43 which has been in the closed state is controlled in dependence on the pedal stroke, and the brake oil from the master cylinder 10 is supplied to the stroke simulator 30. Thus, the brake pedal 11 has a proper reaction force exerted thereon, as described later. Also, each of the wheel cylinders WC1-WC4 is supplied with the brake oil of the pressure depending on a pedal stroke detected by the pedal stroke sensor 11. More specifically, the solenoid valves 52, 54 are closed, the solenoid valves 46, 48 remain in the closed state, and the solenoid valves 45, 47, 51, 53 are opened, so that high pressure brake oil from the pressurized fluid supply source 20 is supplied to each of the wheel cylinders WC1-WC4.

On the other hand, when the brake pedal 11 is returned, the brake oil in the first oil pressure chamber 32 of the stroke simulator 30 is ejected by the action of the urging force of the spring 34 in the stroke simulator 30 to the master cylinder 10 through the one-way valve 44. This results in exerting a proper reaction force on the brake pedal 11. Further, the brake oils within the wheel cylinders WC1-WC4 are returned to the reservoir tank 12 through the solenoid valves 46, 48, 52, 54 because of the openings of the solenoid valves 46, 48, 52, 54 and the closings of the solenoid valves 45, 47, 51, 53, respectively.

In the abnormal state or not properly operating state of the pressurized fluid supply source 20, the solenoid valves 41,42, 45-48, 51-54 and the differential pressure control valve 43 are controlled to be all in the de-energized state. That is, the differential pressure control valve 43 blocks the communication of the master cylinder 10 with the stroke simulator 30, the solenoid valves 41, 42 bring the first and second outlet ports 10a, 10b of the master cylinder 10 into communication respectively with the wheel cylinders WC1, WC2, and the solenoid valves 45 to 48 remain closed. Thus, when the brake pedal 11 is stepped on, the brake oil in the master cylinder 10 is supplied to the wheels cylinders WC1, WC2 through the solenoid valves 41, 42. On the other hand, when the brake pedal 11 having been stepped on is returned, the brake oils in the wheel cylinders WC1, WC2 are drained to the master cylinder 10 respectively through the solenoid valves 41 and 42.

Further, the operation of the differential pressure control valve 43 provided in the vehicle brake device A as constructed above will be described in detail with reference to a flow chart shown in FIG. 2. While an ignition switch (not shown) of the vehicle is kept in ON-state, the ECU 70 repetitively executes a program corresponding to the flow chart at a predetermined short time interval. Each time starting the execution of the program at step 100 in FIG. 2, the ECU 70 detects at step 102 the moving amount (stroke amount or pedal stroke) of the brake pedal 11 being operated, by the pedal stroke sensor 11a. (Pedal operation state detection means.)

At step 104, the ECU 70 drives a controlled differential pressure which corresponds to the pedal stroke detected previously at step 102, from the curve (operation expression) having been stored in advance to represent the correlation between the pedal stroke and the controlled differential pressure as shown in FIG. 3. (Controlled differential pressure deriving means) Then, at step 106, the ECU 70 derives an applied electric current value corresponding to the controlled differential pressure derived previously at step 104, from the curve (operation expression) having been stored in advance to represent the correlation between the controlled differential pressure and the applied electric current value as shown in FIG. 4. (Applied electric current driving means) Subsequently, at step 108, the ECU 70 controls the differential pressure control valve 43 based on the applied electric current value derived at step 106. (Differential pressure control vale control means)

Figure 6:
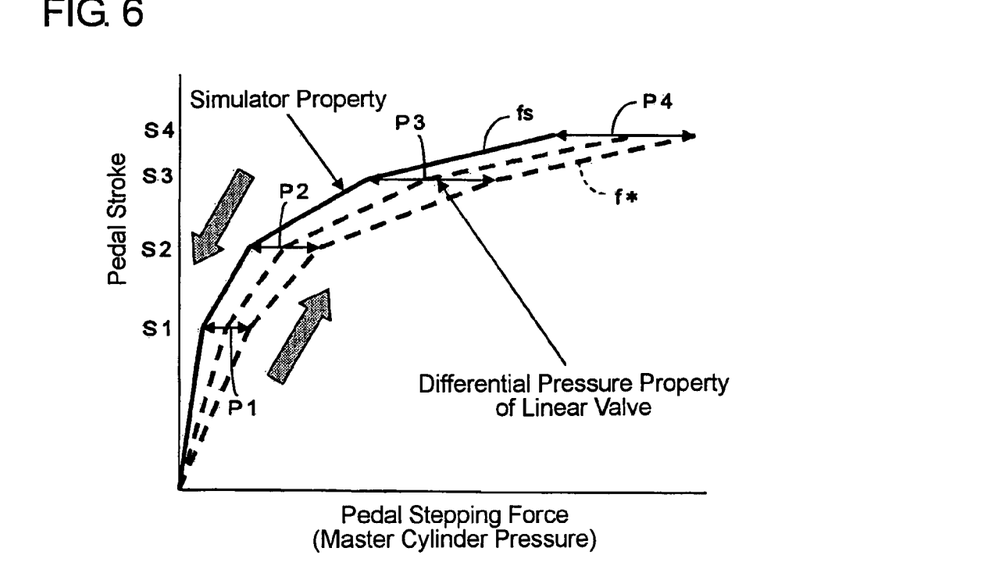
FIG. 6 is another graph showing a pedal stroke to pedal stepping force property used for explaining the operation of the vehicle brake device in the first embodiment according to the present invention.

As understood from the foregoing description, in the present embodiment, since the application of the applied electric current to the differential pressure control valve 43 is controlled to generate a controlled differential pressure corresponding to the pedal stroke between the both ports 43a and 43b, the first outlet port 10a of the master cylinder 10 has a pressure or a target property (f*) which is made by adding the control differential pressure corresponding to the pedal stroke, to the property of the stroke simulator 30 (refer to FIG. 6). Thus, an accurate and reliable controlled differential pressure can be generated also at the time of any pedal stroke, and any delay in operation can be prevented from occurring when the differential pressure control valve 43 is brought again into the open state from the close state, so that it can be realized to obtain a pedal feeling which is smooth without suffering any delay in response. Also, since the controlled differential pressure can be easily altered by controlling the electric current applied to the differential pressure control valve 43, it becomes possible to easily alter the reaction force property of the brake pedal 11 to meet any particular model of the vehicle. In addition, where a plurality of target properties (f*) are provided for the driver to select a desired target property (f*) therefrom, there can be provided at a low cost a vehicle which is capable of easily setting the pedal reaction force to meet the driver's taste.

Further, the ECU 70 at step 102 detects the pedal stroke of the brake pedal 11 as the pedal operation state of the brake pedal 11 by the pedal stroke sensor 11a and at step 104, derives a controlled differential pressure corresponding to the pedal stroke having been detected previously at step 102, from the curve (operation expression) stored in advance and representing the correlation between the pedal stroke and the controlled differential pressure as shown in FIG. 3. The ECU 70 at step 106 drives an applied electric current value corresponding to the controlled differential pressure which has been previously derived at step 104, from the curve (operation expression) stored in advance and representing the correlation between the controlled differential pressure and the applied electric current value as shown in FIG. 4, and at step 108, controls the differential pressure control valve 43 by the use of the electric current value derived at step 106. Accordingly, it can be realized to control the differential pressure control valve 43 so that the controlled differential pressure generated by the same corresponds exactly to the pedal stroke.

In the foregoing embodiment, the pedal stroke is utilized as the pedal operation state, and the differential pressure control valve 43 is controlled to generate the controlled differential pressure corresponding to the detected pedal stroke. Instead, a master cylinder stroke may be utilized as the pedal operation state, and the differential pressure control valve 43 may be controlled to generate the controlled differential pressure corresponding to the master cylinder stroke.

Although in the foregoing embodiment, the stroke simulator 30 is provided to be in communication with the first outlet port 10a of the master cylinder 10, it may be provided to be in communication with the second outlet port 10b of the master cylinder 10.

Second Embodiment

Figure 7:
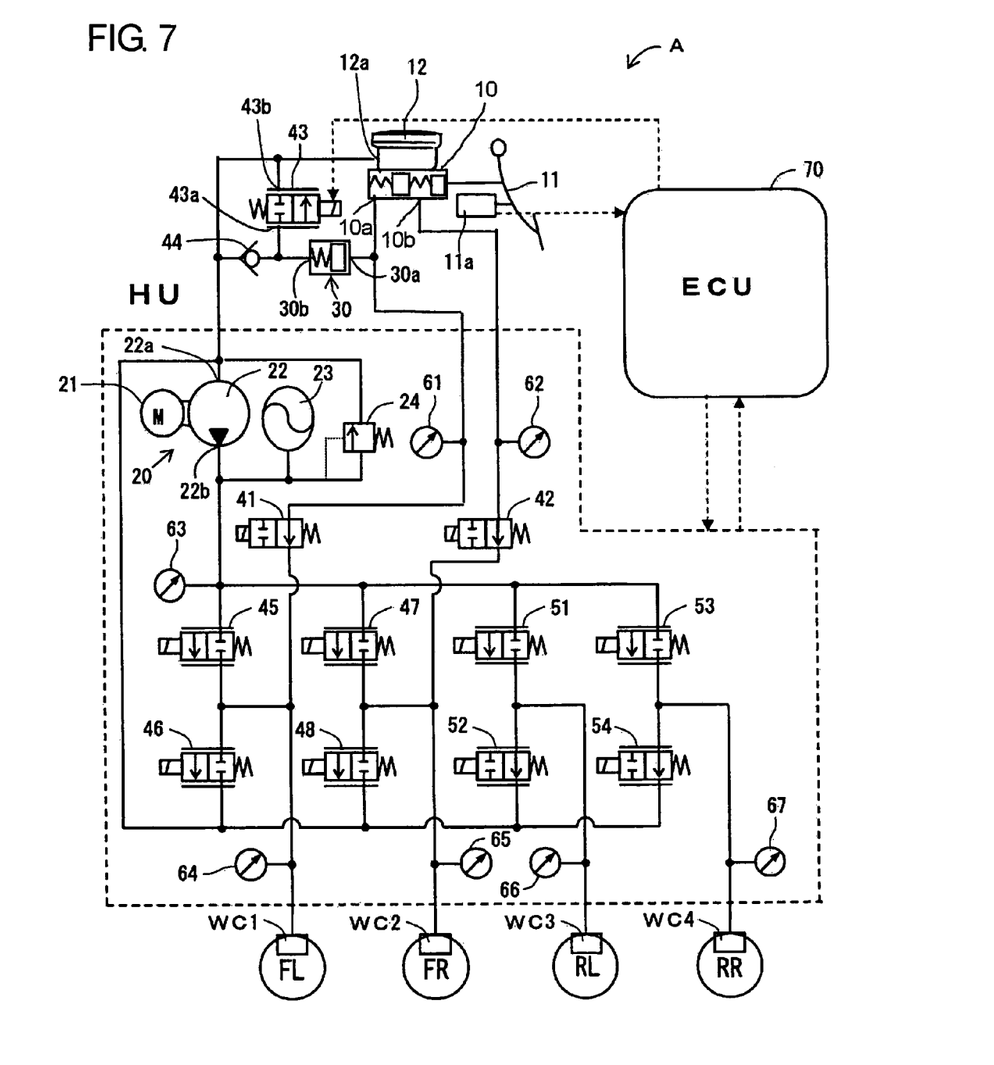
FIG. 7 is a fluid circuit diagram showing the schematic construction of a vehicle brake device in a second embodiment according to the present invention.

Hereinafter, a vehicle brake device in a second embodiment according to the present invention will be described with reference to FIG. 7. FIG. 7 is a fluid circuit diagram showing the schematic construction of the vehicle brake device A in the second embodiment. The components in the second embodiment which are identical to those in the first embodiment are given the same reference numerals as used in the first embodiment and are omitted from being described in detail. Therefore, the following description is addressed to the respects which are different from those in the first embodiment.

In the foregoing first embodiment, the differential pressure control valve 43 and the one-way valve 44 are provided in parallel relation between the first outlet port 10a of the master cylinder 10 and the stroke simulator 30. However, in the second embodiment, the differential pressure control valve 43 and the one-way valve 44 are provided in parallel relation between the stroke simulator 30 and the reservoir tank 12. In this case, the stroke simulator 30 communicates at its inlet port 30a with the first outlet port 10a of the master cylinder 10. The differential pressure control valve 43 is constituted by a solenoid valve of the type which has two ports 43a, 43b connected respectively to the outlet port 30b of the stroke simulator 30 and the inlet port 12a of the reservoir tank 12 and which is capable of controlling the differential pressure between the both ports 43a and 43b. The differential pressure control valve 43 blocks the communication between the outlet port 30b of the stroke simulator 30 and the inlet port 12a of the reservoir tank 12 when in the de-energized state as shown therein, but brings the both ports 30b, 12a into communication to generate a differential pressure corresponding to the value of the electric current applied thereto when in the energized state. Further, the differential pressure control valve 43 functions as a stroke simulator cutting valve which is energized and opened in the normal state of the pressurized fluid supply source 20 to bring the reservoir tank 12 and the stroke simulator 30 into communication and which is de-energized and closed in the abnormal state of the pressurized fluid supply source 20 to block the communication between the reservoir tank 12 and the stroke simulator 30. The one-way valve 44 is provided in parallel relation with the differential pressure control valve 43 between the outlet port 30b of the stroke simulator 30 and the inlet port 12a of the reservoir tank 12 and permits the flow only from the reservoir tank 12 to the stroke simulator 30.

In accordance with the second embodiment as constructed above, when the brake pedal 11 is stepped on, the ECU 70 controls the energization of the differential pressure control valve 43 to generate a controlled differential pressure corresponding to the pedal stroke of the brake pedal 11 between the both ports 43a and 43b. This results in generating at the first outlet port 10a of the master cylinder 10a pressure that is made by adding a controlled differential pressure corresponding to the pedal stroke to the property of the stroke simulator 30. Further, even where the stoke simulator 30 is one of those which involve non-uniformity among their properties, it can be realized to easily adjust the pedal reaction force by modifying a control program used therein. Further, when the brake pedal 11 is returned, the pressurized oil within the reservoir tank 12 is returned to the stroke simulator 30 through the one-way valve 44, so that there can be obtained a suitable pedal feeling. In addition, since the pulsation which may be generated when the differential pressure control valve 43 is operated can be absorbed by the stroke simulator 30, it can be prevented that the pulsation so generated travels to the brake pedal 11 through the master cylinder 10.

Third Embodiment

Figure 8:
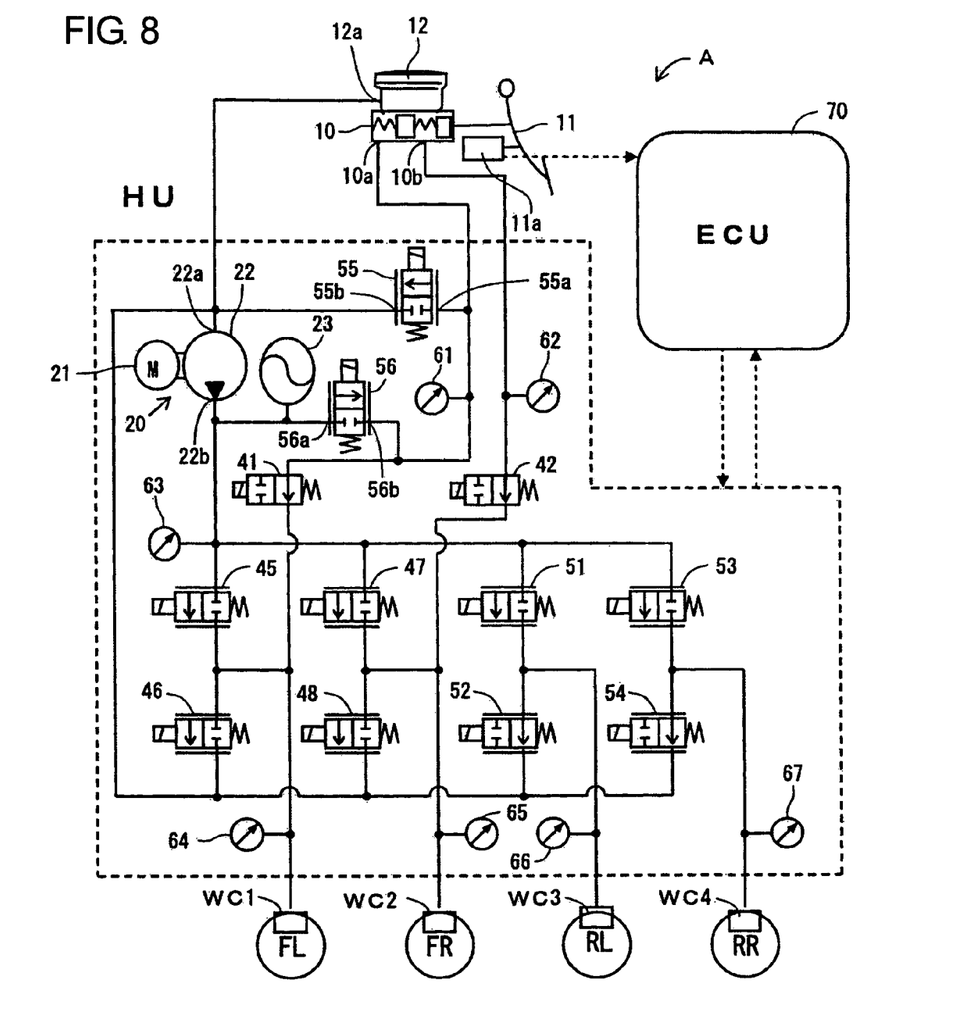
FIG. 8 is a fluid circuit diagram showing the schematic construction of a vehicle brake device in a third embodiment according to the present invention.

Hereinafter, a vehicle brake device in a third embodiment according to the present invention will be described with reference to FIG. 8. FIG. 8 is a fluid circuit diagram showing the schematic construction of the vehicle brake device A in the third embodiment. The components in the third embodiment which are identical to those in the first embodiment are given the same reference numerals as used in the first embodiment and are omitted from being described in detail. Therefore, the following description is addressed to the respects which are different from those in the first embodiment.

The stroke simulator 30 of the mechanical type is provided in the foregoing first embodiment. Instead thereof, in the third embodiment, there are provided first and second differential pressure control valves 55, 56. Like the foregoing differential pressure control valve 43, the first differential control valve 55 is constituted by a solenoid valve of the type which has two ports 55a and 55b and which is capable of controlling the differential pressure between the both ports 55a and 55b. The ports 55a and 55b are connected respectively to the first outlet port 10a of the master cylinder 10 and the inlet port 12a of the reservoir tank 12. Like the foregoing differential pressure control valve 43, the second differential control valve 56 is constituted by a solenoid valve of the type which has two ports 56a and 56b and which is capable of controlling the differential pressure between the both ports 56a and 56b. The ports 56a and 56b are connected respectively to the pressurized fluid supply source 20 (the outlet port 22b of the pump 22) and the first outlet port 10a of the master cylinder 10. The differential control valves 55 and 56 are controllable by the ECU 70 to be energized so that controlled differential pressures corresponding to the operation state of the brake pedal 11 are generated respectively between the both ports 55a and 55b and between the both ports 56a and 56b.

Like as the first embodiment, the memory unit of the ECU 70 has stored the curve (operation expression) as shown in FIG. 3. This curve represents the correlation between the pedal operation state (e.g., pedal stroke) and the differential pressure. In the present embodiment, however, since the stroke simulator 30 of the mechanical type is not mounted, the base property (fb) is 0 (zero). Therefore, the controlled differential pressure becomes the same as the target property (f*).

Next, description will be made regarding the operation of the third embodiment as constructed above. When the brake pedal 11 is stepped on, the ECU 70 controls the solenoid valve 41 and the second differential pressure control valve 56 to be closed and also controls the energization of the first differential pressure control valve 55 to generate a controlled differential pressure corresponding to the pedal operation state of the brake pedal 11 between the both ports 55a and 55b. Thus, since the first outlet port 10a of the master cylinder 10 is brought into communication with the inlet port 12a of the reservoir tank 12, a controlled differential pressure depending on the pedal operation state is generated at the first outlet port 10a of the master cylinder 10. When the brake pedal 11 is returned, on the other hand, the ECU 70 controls the solenoid valve 41 to remain in the closed state and the first differential pressure control valve 55 to be closed and also controls the energization of the second differential pressure control valve 56 to generate a controlled differential pressure corresponding to the pedal operation state of the brake pedal 11 between the both ports 56a and 56b. Thus, the pressurized fluid supply source 20 is brought into communication with the first outlet port 10a of the master cylinder 10, and a controlled differential pressure depending on the pedal operation state is generated at the first outlet port 10a of the master cylinder 10. Therefore, according to the present embodiment, in addition to the advantages of the aforementioned first embodiment, there are attained advantages that the stroke simulator of the mechanical type, the one-way valve and the relief valve can be removed so that the device can be decreased in the number of parts, can be lowered in cost and can be downsized.

Fourth Embodiment

Figure 9:
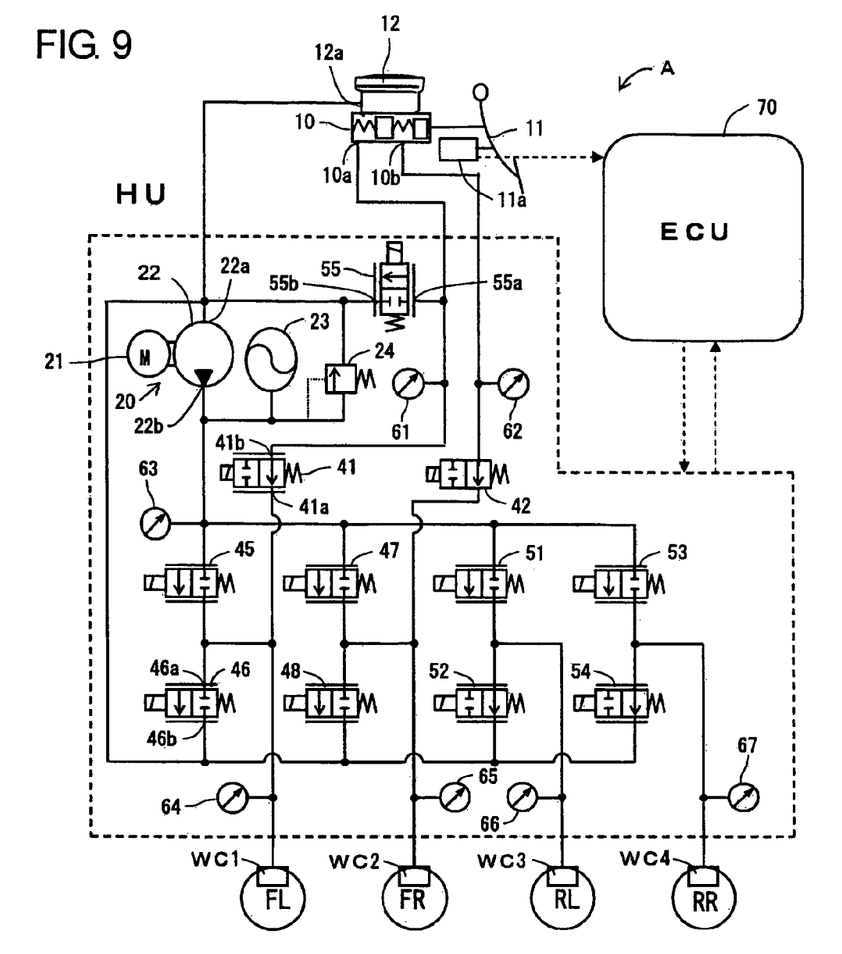
FIG. 9 is a fluid circuit diagram showing the schematic construction of a vehicle brake device in a fourth embodiment according to the present invention.

Hereinafter, a vehicle brake device in a fourth embodiment according to the present invention will be described with reference to FIG. 9. FIG. 9 is a fluid circuit diagram showing the schematic construction of the vehicle brake device A in the fourth embodiment. The components in the fourth embodiment which are identical to those in the first embodiment are given the same reference numerals as used in the first embodiment and are omitted from being described in detail. Therefore, the following description is addressed to the respects which are different from those in the first embodiment.

Like the third embodiment, the fourth embodiment is provided with a solenoid open/close valve (differential pressure control valve) instead of the stroke simulator of the mechanical type and is designed to control the open/close motion of the solenoid open/close valve. However, the fourth embodiment is different from the third embodiment in the following respects. That is, the second differential pressure control valve 56 is removed, and a relief valve 24 is provided like that in the first embodiment. And, a differential pressure control valve is employed to replace the solenoid valve 41 which has been provided in the prior art, and a pedal returning solenoid valve being the solenoid valve through which the brake oil passes to apply a reaction force to the brake pedal 11 when the same is returned is commonly used also as the master cylinder cutting valve.

More specifically, like the aforementioned differential pressure control valve 43, the first differential pressure control valve 55 is constituted by a solenoid valve of the type which has two ports 55a, 55b and which is capable of controlling the differential pressure between the both ports 55a and 55b. The ports 55a and 55b are connected respectively to the first outlet port 10a of the master cylinder 10 and the inlet port 12a of the reservoir tank 12. The solenoid valve 41 is of the normally open type, which like the aforementioned differential pressure control valve 43, has two ports 41a and 41b and which is capable of controlling the differential pressure between the both ports 41a and 41b. The ports 41a and 41b are connected respectively to the wheel cylinder WC1 and the first outlet port 10a of the master cylinder 10. The solenoid valve 46 is of the normally closed type, which like the aforementioned differential pressure control valve 43, has two ports 46a and 46b and which is capable of controlling the differential pressure between the both ports 46a and 46b. The ports 46a and 46b are connected respectively to the wheel cylinder WC1 and the inlet port 12a of the reservoir tank 12. These differential pressure control valves 55, 41 and 46 are controllable by the ECU 70 to be energized so that controlled differential pressures depending on the operation state of the brake pedal 11 are generated respectively between the both ports 55a and 55b, between the both ports 41a and 41b and between the both ports 46a and 46b.

Like that in the first embodiment, the memory unit of the ECU 70 has stored the curve (operation expression) as shown in FIG. 3. This curve represents the correlation between the pedal operation state (e.g., pedal stroke) and the differential pressure. In the present embodiment, however, since the stroke simulator 30 of the mechanical type is not mounted, the base property (fb) is 0 (zero). Therefore, the controlled differential pressure becomes the same as the target property (f*).

Figure 5:
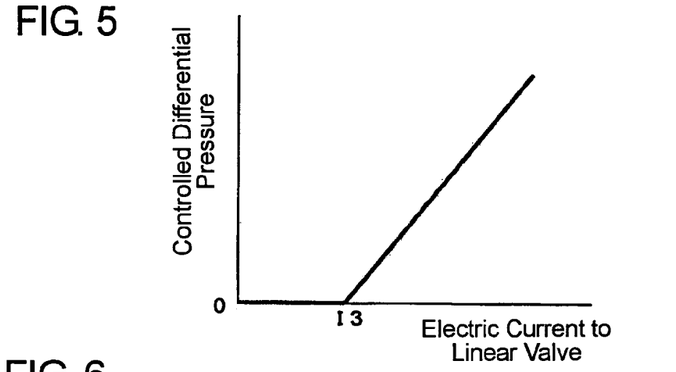
FIG. 5 is another graph showing the correlation between the controlled differential pressure generated by a differential pressure control valve of the normally open type and the value of electric current applied thereto, the correlation being stored in the ECU shown in FIG. 1.

Further, the memory unit of the ECU 70 has stored the curve (operation expression) as shown in FIG. 5. This curve represents the correlation between the controlled differential pressure across the differential pressure control valve 41 of the normally open type and the electric current value applied to the differential pressure control valve 41. The differential pressure control valve 41 is the solenoid valve which is controllable as shown in FIG. 5, wherein the controlled differential pressure remains 0 (zero) within a predetermined current range of 0 to I3 and is generated to increase in direct proportion within another predetermined current range exceeding the electric current I3.

Next, description will be made regarding the operation of the fourth embodiment as constructed above. When the brake pedal 11 is stepped on, the ECU 70 controls the solenoid valve 41 to be closed and also controls the energization of the first differential pressure control valve 55 to generate a controlled differential pressure corresponding to the pedal operation state of the brake pedal 11 between the both ports 55a and 55b. Thus, since the first outlet port 10a of the master cylinder 10 is brought into communication with the inlet port 12a of the reservoir tank 12, the controlled differential pressure depending on the pedal operation state is generated at the first outlet port 10a of the master cylinder 10. When the brake pedal 11 is returned, on the other hand, the ECU 70 controls the first differential pressure control valve 55 to be closed and also controls the energization of the solenoid valve 41 to generate a controlled differential pressure corresponding to the pedal operation state of the brake pedal 11 between the both ports 41a and 41b. Thus, the wheel cylinder WC1 is brought into communication with the first outlet port 10a of the master cylinder 10, and the controlled differential pressure depending on the pedal operation state is generated at the first outlet port 10a of the master cylinder 10. Therefore, according to the present embodiment, since the stroke simulator of the mechanical type and the one-way valve can be removed, the device A can be decreased in the number of parts, can be lowered in cost and can be downsized. Further, since the solenoid valve 41 which has been provided as a master cylinder cutting valve in the prior art can be used also as a pedal returning solenoid valve, the device A can be further decreased in the number of parts, can be further lowered in cost and can be further downsized.

In the foregoing fourth embodiment, when the brake pedal 11 is returned, in addition to the energization control of the solenoid valve 41, the energization control of the solenoid valve 46 may also be performed to generate between the both ports 46a and 46b a controlled differential pressure which realizes the controlled differential pressure corresponding to the pedal operation state of the brake pedal 11 in cooperation with the controlled differential pressure generated between the both ports 41a and 41b of the solenoid valve 41. With the construction so modified, when the brake pedal 11 is returned, a part of the fluid is drained from the wheel cylinder WC1 to the reservoir tank 12 via the solenoid valve 46, so that it can be realized to obtain a more suitable pedal feeling.

Fifth Embodiment

Figure 10:
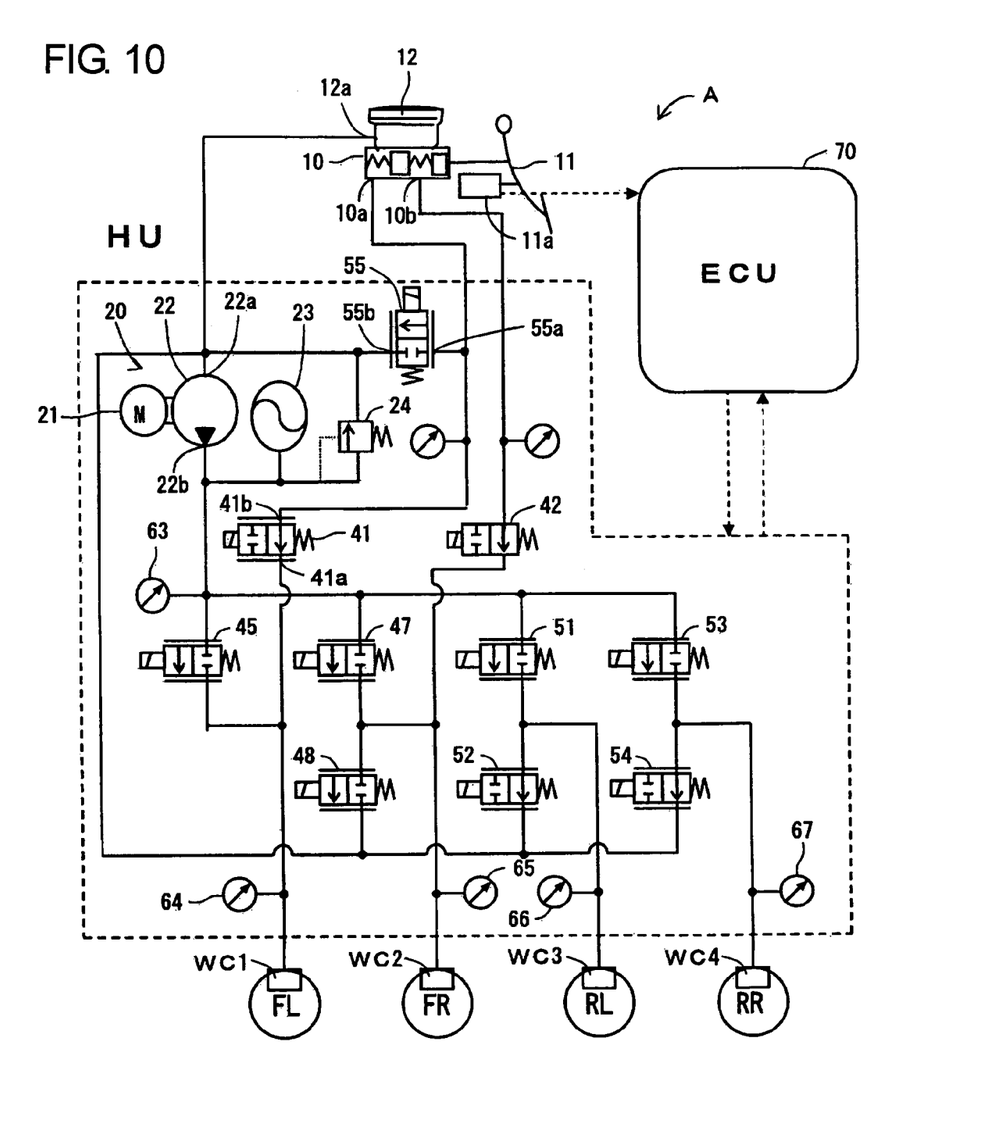
FIG. 10 is a fluid circuit diagram showing the schematic construction of a vehicle brake device in a fifth embodiment according to the present invention.

Hereinafter, a vehicle brake device in a fifth embodiment according to the present invention will be described with reference to FIG. 10. FIG. 10 is a fluid circuit diagram showing the schematic construction of the vehicle brake device A in the fifth embodiment. The components in the firth embodiment which are identical to those in the fourth embodiment are given the same reference numerals as used in the fourth embodiment and are omitted from being described. Therefore, the following description is addressed to the respects which are different from those in the fourth embodiment. The fifth embodiment is constituted by removing the solenoid valve 46 from the fourth embodiment.

Next, description will be made regarding the operation of the fifth embodiment. When the brake pedal 11 is stepped on, the ECU 70 controls the solenoid valve 41 to be closed and also controls the energization of the first differential pressure control valve 55 to generate a controlled differential pressure corresponding to the pedal operation state of the brake pedal 11 between the both ports 55a and 55b. Thus, since the first outlet port 10a of the master cylinder 10 is brought into communication with the inlet port 12a of the reservoir tank 12, the controlled differential pressure depending on the pedal operation state is generated at the first outlet port 10a of the master cylinder 10. When the brake pedal 11 is returned, on the other hand, the ECU 70 controls the solenoid valve 41 being a differential pressure control valve and the first differential pressure control valve 55 so that they cooperate to generate a controlled differential pressure corresponding to the pedal operation state of the brake pedal 11. That is, the wheel cylinder WC1 and the first outlet port 10a of the master cylinder 10 are brought into communication through the solenoid valve 41, and the wheel cylinder WC1 and the inlet port 12a of the reservoir tank 12 are brought into communication through the differential pressure control valve 55 by opening the same when necessary. Thus, the controlled differential pressure depending on the pedal operation state is generated at the first outlet port 10a of the master cylinder 10. With this construction, when the brake pedal 11 is returned, a part of the fluid is drained from the wheel cylinder WC1 to the reservoir tank 12 via the first differential pressure control valve 55. Accordingly, this fifth embodiment can be further decreased in the number of the parts than the foregoing fourth embodiment, so that the device A can be further lowered in cost and can be further downsized.

Various features and many of the attendant advantages in the foregoing embodiment will be summarized as follows:

In the vehicle brake device A in the foregoing first embodiment typically shown in FIG. 1, since control means (i.e., ECU 70) controls the energization of the differential pressure control valve 43 to generate a controlled differential pressure corresponding to the pedal operation state of the brake pedal 11 between the both ports 43a and 43b thereof, it results that a pressure depending on the controlled differential pressure which corresponds at least to the pedal operation state is generated at the outlet port 10a of the master cylinder 10. Thus, since the controlled differential pressure can be generated accurately and reliably even in any state of the pedal operation, any delay in operation can be prevented even when the differential pressure control valve 43 is switched from the closed state again to the open state. Therefore, it can be realized to obtain a pedal feeling which is smooth without suffering any delay in response. Further, since the controlled differential pressure can be altered only by varying the energization of the differential pressure control valve 43, it can be realized to alter the reaction force property of the brake pedal 11 easily for the model of the vehicle.

Figure 2:
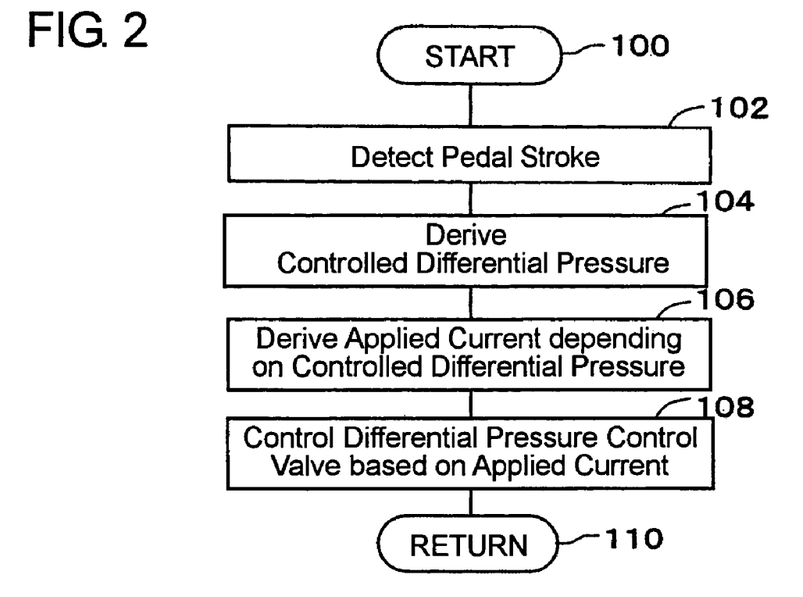
FIG. 2 is a flow chart of a control program executed by an ECU shown in FIG. 1.

Also in the vehicle brake device A in the foregoing first embodiment typically shown in FIGS. 1 and 2, the control means (ECU) 70 operates the pedal operation state detection means 102 to detect the pedal operation state and then operates controlled differential pressure deriving means 104 to derive a controlled differential pressure corresponding to the pedal operation state detected by the pedal operation state detection means 102, from the operation expression or map (shown in FIG. 3) representing the correlation between the pedal operation state and the controlled differential pressure. Then, the control means 70 operates the applied current deriving means 106 to derive an applied current value corresponding to the controlled differential pressure derived by the control differential pressure deriving means 104, from the operation expression or map (shown FIG. 4) representing the correlation between the controlled differential pressure and the applied current value to the differential pressure control valve 43 and further operates the differential pressure control valve control means 108 to control the differential pressure control valve 43 based on the applied current value derived by the applied current deriving means 106. Thus, it can be realized to control the differential pressure control valve 43 so that the controlled differential pressure comes to correspond exactly to the pedal operation state.

Also in the vehicle brake device A in the foregoing first embodiment typically shown in FIG. 1, since when the brake pedal 11 is stepped on, the control means 70 controls the energization of the differential pressure control valve 43 to generate a controlled differential pressure depending on the pedal operation state of the brake pedal 11 between the both ports 43a and 43b, it results that the first outlet port 10a of the master cylinder 10 has generated thereat a pressure which is made by adding a controlled differential pressure depending on the pedal operation state to the property of the stroke simulator 30. According to the embodiment, in addition to the advantages noted above, there are attained advantages that even where the stoke simulator 30 is one of those which involve non-uniformity among their properties, it can be realized to easily adjust the pedal reaction force by modifying the control program used therein. On the other hand, when the brake pedal 11 is returned, the pressurized oil within the stroke simulator 30 is returned to the master cylinder 10 through the one-way valve 44, so that there can be obtained a suitable pedal feeling.

In the vehicle brake device A in the foregoing second embodiment shown in FIG. 7, since when the brake pedal 11 is stepped on, the control means 70 controls the energization of the differential pressure control valve 43 to generate a controlled differential pressure depending on the pedal operation state of the brake pedal 11 between the both ports 43a and 43b, it results that the first outlet port 10a of the master cylinder 10 has generated thereat a pressure which is made by adding a controlled differential pressure depending on the pedal operation state to the property of the stroke simulator 30. Further, even where the stoke simulator 30 is one of those which involve non-uniformity among their properties, it can be realized to easily adjust the pedal reaction force by modifying the control program used therein. On the other hand, when the brake pedal 11 is returned, since the one-way valve 44 enables the oil within the reservoir tank 12 to be drawn into the stroke simulator 30 therethrough, the pressurized oil in the stroke simulator 30 is allowed to be returned to the master cylinder 10, so that there can be obtained a suitable pedal feeling.

In the vehicle brake device A in the foregoing third embodiment shown in FIG. 8, since when the brake pedal 11 is stepped on, the control means 70 controls the energization of the first differential pressure control valve 55 to generate a controlled differential pressure depending on the pedal operation state of the brake pedal 11 between the both ports 55a and 55b, it results that a controlled differential pressure depending on the pedal operation state is generated at the first outlet port 10a of the master cylinder 10. On the other hand, since when the brake pedal 11 is returned, the control means 70 controls the energization of the second differential pressure control valve 56 to generate a controlled differential pressure depending on the pedal operation state of the brake pedal 11 between the both ports 56a and 56b, it results that a controlled differential pressure depending on the pedal operation state is generated at the first outlet port 10a of the master cylinder 10. According to this embodiment, the stroke simulator of the mechanical type and the one-way valve as used in the first and second embodiments can be removed. Therefore, in addition to the advantages of the first embodiment, there are attained advantages that the brake device can be decreased in the number of parts, can be lowered in cost and can be downsized.

In the vehicle brake device A in the foregoing fourth embodiment shown in FIG. 9, since when the brake pedal 11 is stepped on, the control means 70 controls the energization of the first differential pressure control valve 55 to generate a controlled differential pressure depending on the pedal operation state of the brake pedal 11 between the both ports 55a and 55b, it results that a controlled differential pressure depending on the pedal operation state is generated at the first outlet port 10a of the master cylinder 10. On the other hand, since when the brake pedal 11 is returned, the control means 70 controls the energization of the second differential pressure control valve 41 to generate a controlled differential pressure depending on the pedal operation state of the brake pedal 11 between the both ports 41a and 41b, it results that a controlled differential pressure depending on the pedal operation state is generated at the first outlet port 10a of the master cylinder 10. According to this embodiment, there can be attained the same advantages as those in the third embodiment.

Also in the vehicle brake device A in the foregoing fourth embodiment shown in FIG. 9, the second differential pressure control valve 41 constitutes a master cylinder cutting valve. Thus, the vehicle brake device can be further decreased in the number of the parts, so that it can be further lowered in cost and can be further downsized.

Also in the vehicle brake device A in the foregoing fourth embodiment shown in FIG. 9, when the brake pedal 11 is returned, a part of the fluid is drained to the reservoir tank 12 through the third differential pressure control valve 46 having two ports 46a and 46b connected respectively to the brake wheel cylinder WC1 and the reservoir tank 12 and capable of controlling the differential pressure between the both ports 46a and 46b, so that there can be obtained a suitable pedal feeling.

In the vehicle brake device A in the foregoing fifth embodiment shown in FIG. 10, when the brake pedal 11 is returned, a part of the fluid is drained from the brake cylinder WC1 to the reservoir tank 12 through the first differential pressure control valve 55. Thus, the vehicle brake system can be further decreased in the number of the parts, so that it can be further lowered in cost and can be further downsized.

In the vehicle brake device A in any of the foregoing first to fifth embodiments shown in FIG. 1, 7-10, since each of the differential pressure control valves 43, 55, 56, 41 and 46 is constituted by a solenoid valve of the type that is capable of generating a differential pressure proportional to the electric current (i.e., electromagnetic force) applied thereto, the control of the differential pressure can be easily done by using the solenoid valve which has been known in the art.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle brake device comprising:
a master cylinder for generating a fluid pressure depending on the stepping state of a brake pedal;
a pedal stroke sensor for detecting a pedal stroke of the brake pedal;
a differential pressure control valve constituted by a solenoid valve including two ports and configured to vary the differential pressure between the two ports, when the brake pedal is depressed, in dependence on the pedal stroke detected by the pedal stroke sensor, and connected at one of the two ports thereof directly to an outlet port of the master cylinder;
control means for controlling the energization of the differential pressure control valve to generate a controlled differential pressure between the two ports of the differential pressure control valve, the control means including controlled differential pressure deriving means for deriving the controlled differential pressure corresponding to the pedal stroke detected by the pedal stroke sensor;
a stroke simulator connected directly to the other port of the differential pressure control valve for absorbing the pressurized fluid supplied from the outlet port of the master cylinder through the differential pressure control valve; and a one-way valve arranged in parallel relation with the differential pressure control valve for permitting the flow only from the stroke simulator to the master cylinder;
wherein the controlled differential pressure deriving means is configured to derive the controlled differential pressure from an operation expression or a map representing the correlation between the pedal stroke detected by the pedal operation state detection means and the controlled differential pressure; and
wherein the control means further includes:
applied current deriving means for deriving an applied current value corresponding to the controlled differential pressure derived by the control differential pressure deriving means, from an operation expression or a map representing the correlation between the controlled differential pressure and the applied current value to the differential pressure control valve; and
differential pressure control valve control means for controlling the differential pressure control valve based on the applied current value derived by the applied current deriving means.

2. A vehicle brake device comprising:
a master cylinder for generating a fluid pressure depending on the stepping state of a brake pedal;
a differential pressure control valve constituted by a solenoid valve including two ports and configured to control the differential pressure between the two ports, and connected at one of the two ports thereof directly to an outlet port of the master cylinder;
control means for controlling the energization of the differential pressure control valve to generate a controlled differential pressure corresponding to the pedal operation state of the brake pedal between the two ports of the differential pressure control valve;
pedal operation state detection means for detecting a pedal stroke of the brake pedal as the pedal operation state;
controlled differential pressure deriving means for deriving a controlled differential pressure corresponding to the pedal stroke detected by the pedal operation state detection means, from an operation expression or a map representing the correlation between the pedal stroke detected by the pedal operation state detection means and the controlled differential pressure;
applied current deriving means for deriving an applied current value corresponding to the controlled differential pressure derived by the control differential pressure deriving means, from an operation expression or a map representing the correlation between the controlled differential pressure and the applied current value to the differential pressure control valve;
differential pressure control valve control means for controlling the differential pressure control valve based on the applied current value derived by the applied current deriving means;
a stroke simulator having an inlet port to be supplied with pressurized fluid from the master cylinder for absorbing the pressurized fluid supplied from the outlet port of the master cylinder through the differential pressure control valve, the inlet port of the stroke simulator connected directly to the other port of the differential pressure control valve; and
a one-way valve arranged in parallel relation with the differential pressure control valve for permitting the flow only from the stroke simulator to the master cylinder.

3. The vehicle brake device as set forth in claim 1, further comprising:
a reservoir tank for storing the fluid returned from a brake wheel cylinder which restrains the rotation of a vehicle wheel.

4. The vehicle brake device as set forth in claim 1, wherein the differential pressure control valve is a solenoid valve which generates a differential pressure proportional to an electromagnetic force.

5. A vehicle brake device comprising:
a master cylinder for generating a fluid pressure depending on the stepping state of a brake pedal;
a pedal stroke sensor for detecting a pedal stroke of the brake pedal;

a differential pressure control valve constituted by a solenoid valve including two ports and configured to vary the differential pressure between the two ports, when the brake pedal is depressed, in dependence on the pedal stroke detected by the pedal stroke sensor, and connected at one of the two ports thereof directly to an outlet port of the master cylinder;

control means for controlling the energization of the differential pressure control valve to generate a controlled differential pressure between the two ports of the differential pressure control valve, the control means including controlled differential pressure deriving means for deriving a controlled differential pressure corresponding to the pedal stroke detected by the pedal stroke sensor;

a stroke simulator connected directly to the other port of the differential pressure control valve for absorbing the pressurized fluid supplied from the outlet port of the master cylinder through the differential pressure control valve;

a one-way valve arranged in parallel relation with the differential pressure control valve for permitting the flow only from the stroke simulator to the master cylinder;

wherein the differential pressure control valve, when energized, communicates the two ports with each other through an opening degree that generates the controlled differential pressure derived by the controlled differential pressure deriving means between the two ports, to permit the flow of the pressurized fluid from the one port to the other of the two ports, and upon the stepping of the brake pedal, the outflow of the pressurized fluid from the outlet port of the master cylinder is permitted to give the brake pedal a reaction force and a stroke;

wherein the controlled differential pressure deriving means is configured to derive the controlled differential pressure from an operation expression or a map representing the correlation between the pedal stroke detected by the pedal stroke sensor and the controlled differential pressure; and wherein the control means further includes:

applied current deriving means for deriving an applied current value corresponding to the controlled differential pressure derived by the control differential pressure deriving means, from an operation expression or a map representing the correlation between the controlled differential pressure and the applied current value to the differential pressure control valve; and differential pressure control valve control means for controlling the differential pressure control valve based on the applied current value derived by the applied current deriving means.

6. The vehicle brake device as set forth in claim 5, further comprising:

a reservoir tank for storing the fluid returned from a brake wheel cylinder which restrains the rotation of a vehicle wheel.

7. The vehicle brake device as set forth in claim 5, wherein the differential pressure control valve is a solenoid valve configured to generate a differential pressure proportional to an electromagnetic force.

8. A vehicle brake device comprising:

a master cylinder for generating a fluid pressure depending on the stepping state of a brake pedal;

a pedal stroke sensor for detecting a pedal stroke of the brake pedal;

a differential pressure control valve constituted by a solenoid valve including two ports and configured to vary the differential pressure between the two ports, when the brake pedal is depressed, in dependence on the pedal stroke detected by the pedal stroke sensor, and connected at one of the two ports thereof directly to an outlet port of the master cylinder;

control means for controlling the energization of the differential pressure control valve to generate a controlled differential pressure between the two ports of the differential pressure control valve, the control means including controlled differential pressure deriving means for deriving the controlled differential pressure corresponding to the pedal stroke detected by the pedal stroke sensor;

a stroke simulator connected directly to the other port of the differential pressure control valve for absorbing the pressurized fluid supplied from the outlet port of the master cylinder through the differential pressure control valve; and a one-way valve arranged in parallel relation with the differential pressure control valve for permitting the flow only from the stroke simulator to the master cylinder; and wherein the differential pressure control valve is operable to generate the controlled differential pressure which increases in direct proportion to the value of electric current applied to the differential pressure control valve when the electric current is greater than a predetermined value.

9. The vehicle brake device as set forth in claim 8, wherein the controlled differential pressure is a differential pressure which is generated to be added to a base property being a pedal stroke to pedal stepping force property attributed to a mechanical construction which the vehicle actually has, so as to follow a target property which is a pedal stroke to pedal stepping force property set as a target in the vehicle.

10. The vehicle brake device as set forth in claim 9, wherein a plurality of target properties are provided to be selectable by the driver.

\* \* \* \* \*